United States Patent
Dreller et al.

(10) Patent No.: US 9,143,476 B2
(45) Date of Patent: Sep. 22, 2015

(54) REAL-TIME CLASSIFICATION OF EMAIL MESSAGE TRAFFIC

(71) Applicant: Return Path, Inc., New York, NY (US)

(72) Inventors: Bryan P. Dreller, Boulder, CO (US); Gregory J. Colburn, Louisville, CO (US); George M. Bilbrey, Lafayette, CO (US)

(73) Assignee: Return Path, Inc., New York, NY (US)

( * ) Notice: Subject to any disclaimer, the term of this patent is extended or adjusted under 35 U.S.C. 154(b) by 48 days.

(21) Appl. No.: 13/843,383

(22) Filed: Mar. 15, 2013

(65) Prior Publication Data

US 2014/0082726 A1 Mar. 20, 2014

Related U.S. Application Data

(60) Provisional application No. 61/701,377, filed on Sep. 14, 2012.

(51) Int. Cl.
*G06F 21/55* (2013.01)
*H04L 29/06* (2006.01)
*H04L 12/58* (2006.01)
*G06Q 10/04* (2012.01)
*G06Q 10/06* (2012.01)
*G06Q 10/10* (2012.01)

(52) U.S. Cl.
CPC .............. *H04L 51/26* (2013.01); *G06F 21/55* (2013.01); *G06Q 10/04* (2013.01); *G06Q 10/0635* (2013.01); *G06Q 10/107* (2013.01); *H04L 63/126* (2013.01); *H04L 63/14* (2013.01)

(58) Field of Classification Search
CPC ......... H04L 51/00; H04L 51/26; H04L 63/14; H04L 63/1441; H04L 63/126
See application file for complete search history.

(56) References Cited

U.S. PATENT DOCUMENTS

| | | | |
|---|---|---|---|
| 6,052,709 A | 4/2000 | Paul | |
| 7,680,892 B2 | 3/2010 | Knox et al. | |
| 7,693,943 B2 | 4/2010 | Rajan et al. | |
| 7,693,950 B2 | 4/2010 | Foulger et al. | |
| 7,809,795 B1 | 10/2010 | Cooley et al. | |
| 8,566,938 B1 * | 10/2013 | Prakash et al. | 726/22 |
| 2006/0200523 A1 * | 9/2006 | Tokuda et al. | 709/206 |
| 2008/0046970 A1 * | 2/2008 | Oliver et al. | 726/3 |

(Continued)

FOREIGN PATENT DOCUMENTS

WO WO-2008091986 A1 7/2008

OTHER PUBLICATIONS

"Solutions for Mailbox Providers," Fact Sheet for Mailbox Providers, 3 pages. (c) 2012.
"Reputation Monitor," Fact Sheet for Marketers, 2 pages. (c) 2012.
"Domain Protect," Fact Sheet for Mailbox Providers, 3 pages. (c) 2012.

(Continued)

*Primary Examiner* — Gilberto Barron, Jr.
*Assistant Examiner* — Arya Golriz
(74) *Attorney, Agent, or Firm* — Blank Rome LLP

(57) ABSTRACT

A classification system has a classification server that receives data for an email and determines if the email message is suspicious, legitimate but failing authentication, forwarded or fully authenticated and legitimate when the domains are owned, or not owned, by the domain owner. Email messages are categorized and presented in a report that enables the email sender to identify and fix a network, malicious traffic, and legitimate messages that have failed authentication beyond control. It also highlights where everything is going well.

18 Claims, 16 Drawing Sheets

(56) References Cited

U.S. PATENT DOCUMENTS

| | | | |
|---|---|---|---|
| 2008/0133672 A1* | 6/2008 | Gillum | 709/206 |
| 2008/0256210 A1* | 10/2008 | Malik | 709/206 |
| 2009/0113016 A1* | 4/2009 | Sen et al. | 709/207 |
| 2009/0300768 A1 | 12/2009 | Krishnamurthy et al. | |
| 2009/0307320 A1* | 12/2009 | Golan et al. | 709/206 |
| 2010/0299399 A1* | 11/2010 | Wanser et al. | 709/206 |
| 2012/0167233 A1 | 6/2012 | Gillum | |

OTHER PUBLICATIONS

"DMARC," Fact Sheet for Mailbox Providers, 3 pages. (c) 2012.

E. M. Kucherawy, "Domain-Baed Message Authentication, Reporting and Conformance (DMARC)," Jan. 4, 2013, DMARC.org, pp. 1-77.

European Search Report dated Dec. 4, 2013, filed in European Application No. 13183921.9.

\* cited by examiner

| IP Address | Hostname | My IP | Sender Score | Location | MFrom | | Messages Seen | Policy Applied |
|---|---|---|---|---|---|---|---|---|
| 10.10.0.12 | mta06.badguy.com [Whois] | x | 45 | United States | badguy.com | | 7 | 7 |
| 192.168.12.6 | mx12.newisp.de [Whois] | x | 0 | Germany | customer.domain.com | | 4 | 0 |

Domain Totals

| | Messages Seen ⓘ | Policy Applied ⓘ | Total IPs ⓘ |
|---|---|---|---|
| | 3,485 | 3,189 | 444 |

Category Totals click category to view details

| | | Messages Seen | Policy Applied | IPs |
|---|---|---|---|---|
| 203a | Suspicious Messages ⓘ | 3,243 | 3,147 | 323 |
| 203b | Authentication Failures ⓘ | 120 [205b] 8 [205c] 7 |
| 203c | Automatic Forwarding ⓘ | 111 | 34 | 103 |
| 203d | No Problems ⓘ | 11 | 0 | 11 |

[205d] [205e] [205a]
Authentication Details | Alignment Details | Message Subjects | Trend

[701] [702]

| From Domain | DKIM Domain | MFrom Domain | Messages Seen ▼ | Policy Applied | IPs |
|---|---|---|---|---|---|
| customer.domain.com | Unavailable [705] | customer.domain.com | 113 | 8 | 5 |
| customer.domain.com | customer.domain.com | customer.domain.com | 7 | 0 | 2 |

Authentication Results by ISP

● DKIM Pass Rate  [1001]
○ SPF Pass Rate

[Last 24 Hours ▼]

| Domain ▼ | Google % | Yahoo % | Hotmail % | AOL % | NetEase % | XS4ALL % | Facebook % | LinkedIn % |
|---|---|---|---|---|---|---|---|---|
| domain.com | 85.9 [1002] | 0 | 0 | 86.45 | 0 | 97.24 [1003] | 0 | 0 |
| mail.domain.com | 100 | 0 | 0 | 0 | 0 | 0 | 0 | 0 |
| www.domain.com | 100 [1004] | 0 | 0 | 0 | 0 | 0 | 0 | 0 |

1101c Return-Path: <goingtotrap1@badguy.com>
1101b, 1101f Received-SPF: pass (domain of goingtotrap1@badguy.com 10.10.10.12 permitted);
1101d, 1101e Authentication-Results:dkim=none header.i=@badguy.com
Subject: Update your account information for Big Bank
1101a From: Big Bank Account Services <accounts@bigbank.com>

Dear Customer,

Thank you for your continued business. Big Bank is updating it's customer records.

Click <a href='http://www.badguy.com/account_update.html'> here </a> to update your Account Information.

Sincerely,

Big Bank Account Services

1102c Return-Path: <goingtotrap0@badguy.com>

1102b,1102f Received-SPF: fail (trapnetwork.com: domain of goingtotrap0@badguy.com 10.10.10.56 not permitted sender);

1102d,1102e Authentication-Results: dkim=none header.i=@badguy.com

Subject: An article from the Newspaper

1102a From: Your Local Newspaper <goingtotrap@badguy.com>

Here's an article from the Newspaper. Click the following link to read an interesting article. <a href='http://www.badguy.com/article_with_malware.html'> article </a>

| | 1103b | | 1103c | 1103a | 1103d | 1103e | 1103f | 1103g |
|---|---|---|---|---|---|---|---|---|
| date | source_ip | delivery_result | mf_header | from_header | dkim_domain | auth_dkim | auth_spf | count |
| 20130201 | 79.79.79.79 | delivered | bigbank.com | bigbank.com | bigbank.com | fail | fail | 7m |

```
--------------Boundary-00=_S3TY4Y7kX93yP9uUPRhg
Content-Type: text/plain; charset="us-ascii"
Content-Disposition: inline
Content-Transfer-Encoding: 7bit This is an authentication failure report for an email message received from
accounts.bigbank.com on 13 Dec 2012 10:28:40 +0000(GMT)

--------------Boundary-00=_S3TY4Y7kX93yP9uUPRhg
Content-Type: message/feedback-report
Content-Disposition: inline
Content-Transfer-Encoding: 7bit Feedback-Type: other
```
1104c Original-Mail-From: status@accounts.bigbank.com

1104b Arrival-Date: 13 Dec 2012 10:28:40 +0000(GMT)

1104a Source-IP: 11.12.13.15

Reported-Domain: accounts.bigbank.com
Policy-Action: none

```
--------------Boundary-00=_S3TY4Y7kX93yP9uUPRhg
Content-Type: text/rfc822-headers
Content-Disposition: inline
Content-Transfer-Encoding: 7bit
```

1104f Received-SPF: pass (domain of accounts.bigbank.com designates 11.12.13.15 as permitted sender)

1104d,1104e Authentication-Results: from=accounts.bigbank.com; dkim=fail (permerr)

Date: Thu, 13 Dec 2012 12:28:38 +0300

From: Account Services <status@accounts.bigbank.com>
Subject: Your Big Bank Statement

```
<?xml version="1.0" encoding="windows-1252"?>
<feedback xmlns:xsi="http://www.w3.org/2001/XMLSchema-instance"
xmlns:ns1="http://dmarc.org/dmarc-xml/0.1"
xsi:schemaLocation="http://dmarc.org/dmarc-xml/0.1 dmarc_agg_report.xsd">
  <report_metadata>
    ...
    <date_range>
      <begin>1363060800</begin>
      <end>1363147200</end>
    </date_range>
  </report_metadata>
  <policy_published>
```
1105a      `<domain>bigbank.com</domain>`
```
    ...
  </policy_published>
  <record>
    <row>
```
1105b      `<source_ip>11.12.13.14</source_ip>`
1105g      `<count>18</count>`
```
      <policy_evaluated>
        <disposition>none</disposition>
      </policy_evaluated>
    </row>
    <identifiers>
      <header_from>bigbank.com</header_from>
    </identifiers>
    <auth_results>
      <dkim>
```
1105d        `<domain>bigbank.com</domain>`
1105e        `<result>pass</result>`
```
      </dkim>
      <spf>
```
1105c        `<domain>bigbank.com</domain>`
1105f        `<result>pass</result>`
```
      </spf>
    </auth_results>
```

| From Domain | Authorized Sending IP Address |
|---|---|
| bigbank.com | 11.12.13.14 |
| accounts.bigbank.com | 11.12.13.15 |

1107

| Known Forwarding IP Address |
|---|
| 79.79.79.79 |
| 128.128.0.192 |

REAL-TIME CLASSIFICATION OF EMAIL MESSAGE TRAFFIC

RELATED APPLICATION

This application claims the benefit of U.S. Provisional Application No. 61/701,377, filed Sep. 14, 2012, the entire content of which is incorporated herein by reference.

BACKGROUND OF THE INVENTION

1. Field of the Invention

The invention relates to email fraud detection, prevention, and mitigation.

2. Background of the Related Art

Email is a widely used communication channel for companies ("domain owners") of any size or type, and there is very limited technology in place to verify the authenticity of an email message, its sender, and its origin. It is easy to counterfeit an email whereby an illegitimate originator of an email can purport that an email message comes from a domain owner's domain but it in fact comes from a different source. The result is rampant phishing, financial scams, malware, etc. being delivered via email fraudulently appearing to originate from a trusted source. Phishing emails may contain links to websites that are infected with malware. Phishing is typically carried out by e-mail spoofing or instant messaging, which often direct a user to a fake website whose look and feel are almost identical to the legitimate one.

There are email data exchange mechanisms in place that report information about email flows to "domain owners" that are available universally. These exchange mechanism provide varying levels of insight to fraudulent email streams.

(1) One of the most widely used exchange mechanisms is the email "Feedback Loop". Most email mailbox providers (e.g., Yahoo!, AOL, Gmail) offer a way for email mailbox owners to flag a received email as unwanted. This is usually called the "Spam" button. When an email recipient determines that a received email is unwanted they simply click the "Spam" or equivalent button. The email mailbox provider then creates a message called a "complaint" containing a small report and a copy of the unwanted message. Normally the complaint is sent to the "domain owner" of the unwanted email as defined by the "return-path" header within the email message, RFC 3834. Return Path Inc. hosts "Feedback Loops" on behalf of various mailbox providers. The data generated by the "Feedback Loops" is referred to as "Complaint" data. The specifications for this data are defined in RFC 6449 for Complaint Feedback Loop Operational Recommendations, and RFC 6650 for Creation and Use of Email Feedback Reports: An Applicability Statement for the Abuse Reporting Format (ARF).

(2) A second type of email data exchange mechanism is DMARC (Domain-based Message Authentication, Reporting and Conformance). DMARC is an open specification draft for the purpose of reducing email fraud through the enforcement of established email authentication mechanisms of DKIM (DomainKeys Identified Mail) and SPF (Sender Policy Framework). DMARC combines the authentication checks provided by DKIM and SPF with an identifier alignment check to calculate a DMARC pass or fail status for an email. The alignment identifier check is the comparison of the FROM DOMAIN (RFC5322), MAIL FROM DOMAIN and DKIM DOMAIN. Mailbox providers or Email Receivers are encouraged to use the DMARC pass or fail to determine delivery to an email recipient. Domain Owners enable DMARC checks for their mail streams by publishing a TXT record in DNS per the DMARC specification. The DMARC TXT record contains configuration parameters related to DMARC's reporting and policy enforcement capabilities. Policy will be discussed below in the Policy section.

DMARC provides two different types of data. The primary data type is an aggregated report of all email received from a specific "From domain" for a given time period, usually one 24 hour period. The aggregate report provides a summary of all email traffic broken down by SENDING IP ADDRESS, a count of emails received and the status of the respective DMARC checks, DKIM, SPF and identifier alignment. This report is referred to as a DMARC Aggregate data. The next data type is called a Forensic Report. A Forensic Report is generated by an email Receiver when an email fails the DMARC test. A Forensic report contains a brief machine-readable report and a full or redacted copy of the offending email message. The format of the Forensic report is currently defined by RFC 6591. This report type is referred to as a DMARC Forensic data. The relevant RFCs are RFC 6376-DomainKeys Identified Mail (DKIM) Signatures, RFC 4408-Sender Policy Framework (SPF) for Authorizing Use of Domains in E-Mail, Version 1, dmarc_draft-base-00-03-Domain-based Message Authentication, Reporting and Conformance (DMARC), RFC 6591-Authentication Failure Reporting Using the Abuse Reporting Format, RFC 5322-Internet Message Format.

(3) A third type of email data exchange mechanism that exists is not available to the general public. Domain Owners are usually only given access to the data, often indirectly, via business agreements with E-mail/service providers, security companies, or related businesses. This non-public email data exchange information can be used to diagnose fraudulent email and includes spam trap feed, private aggregate data, private message level data and subscriber data.

A Spam trap network is a collection of user email accounts that are designed to catch spam or fraudulent email by way of not publishing or providing the destination mailbox's email address. Any messages received at these unpublished mailboxes are typically fraudulent in nature. A Spam Trap feed includes data generated by these spam trap networks, and can include full email message samples for all mail sent into the Spam Trap network.

Mailbox providers can provide data feeds that specifically contain data for specific mail senders. There are two types of these feeds. The first is private aggregate data authentication data. This type is similar to the DMARC aggregate feed mentioned above, except that the format is non-standard and customized. The second type of feed is a private authentication failure message feed called private message level data throughout, which is also similar to the DMARC forensic type. Many of these feeds pre-date DMARC Forensic and consequently use a nonstandard authentication failure report format. Some newer private authentication failure message feeds incorporate the Authentication Failure format used by DMARC Forensic reports.

(4) The fourth type of data feed which is provided by email account plug-ins such as Other Inbox, operate email account owners with a mechanism to organize their inbox, for example by automatically categorizing the email messages they receive. As part of this mechanism, anonymous user mailbox data can be generated that includes redacted fraudulent email message samples that can be used to perform forensic analysis of the source of the spam and fraud. This includes attributes of the message such as SENDING IP ADDRESS, MAIL FROM, FROM Address, Subject line, and body content including URIS. Additionally, this feed includes meta data for each message describing email user interactions specifically, if the email reached the users inbox which is referred to as inbox placement. This data is referred to as Subscriber Data, such as discussed in U.S. Patent Publication No. 2013-0282477 and U.S. Patent Publication No. 2014-0280624, titled System And Method For Providing Actionable Recommendations To Improve Electronic Mail Inbox Placement And Engagement being filed herewith, the entire contents of which are hereby incorporated by reference.

Of the reporting mechanisms listed above, DMARC and private data feeds enable a domain owner to publish a policy to receivers of email that asserts that a domain owner properly authenticates all of its domain's email messages and if a receiver receives an email message that fails authentication verification, the policy can instruct the receiver to quarantine or reject the email message. Thus prior to publishing a policy, the domain owner needs to verify that it does in fact properly authenticate all email messages sent from a given domain. See "Proactively Block Phishing and Spoofing Attempts" Return-Path-Domain-Protect-FS-9.12__2.pdf, and dmarc_draft-base-00-03-Domain-based Message Authentication, Reporting and Conformance (DMARC).

However, all of the data provided by the listed data exchange formats are very difficult to analyze, normalize and interpret, and not every type of data exists across all mechanisms.

SUMMARY OF THE INVENTION

It is one object of this invention to provide a system and method to collect data relative to the email authentication practices of domain owners and email streams that may appear to belong to a domain owner. It is another object of this invention to collect data from complaint and spam trap systems that is related to certain domain owners. It is another object of this invention to collect data from Mailbox providers through the DMARC Reporting channels for certain domain owners. It is another object of this invention to collect data from subscribers for domain and non-domain owners. It is another object of this invention is to provide a system for classifying data for the identification of fraudulent email purporting to be from a domain owner. It is another object of this invention is to examine and measure email authentication practices of a domain owner. It is another object of this invention is to determine which email has passed through a known email forwarding service and provide a measurement.

It is another object of this invention is to determine which email passed all authentication checks and provide a measurement. It is another object of this invention to provide a visual interface to the above classification and measurements. It is another object to publish a feed of suspected bad content (URLs). It is another object to publish a feed of data to take down venders. It is another object to publish alerts relevant to the data to domain owners. It is yet another object of the invention to show phishing and spoofing attacks on the brand for domain owner originating from other domains not owned by the domain owner.

In accordance with these and other objects, this present invention provides a classification and reporting system that consumes data from the multitude of data exchange sources listed above and provides clear, actionable outputs to inform a domain owner of legitimate but unauthenticated email messages, help them correct it, and take action on fraudulent email messages.

These and other objects of the invention, as well as many of the intended advantages thereof, will become more readily apparent when reference is made to the following description, taken in conjunction with the accompanying drawings.

BRIEF DESCRIPTION OF THE DRAWINGS

FIGS. 4-10 are screen shots showing displays of the invention.

FIGS. 11*a*-11*f* is an example of email messages processed by the invention.

DETAILED DESCRIPTION OF THE PREFERRED EMBODIMENTS

Figure 1:
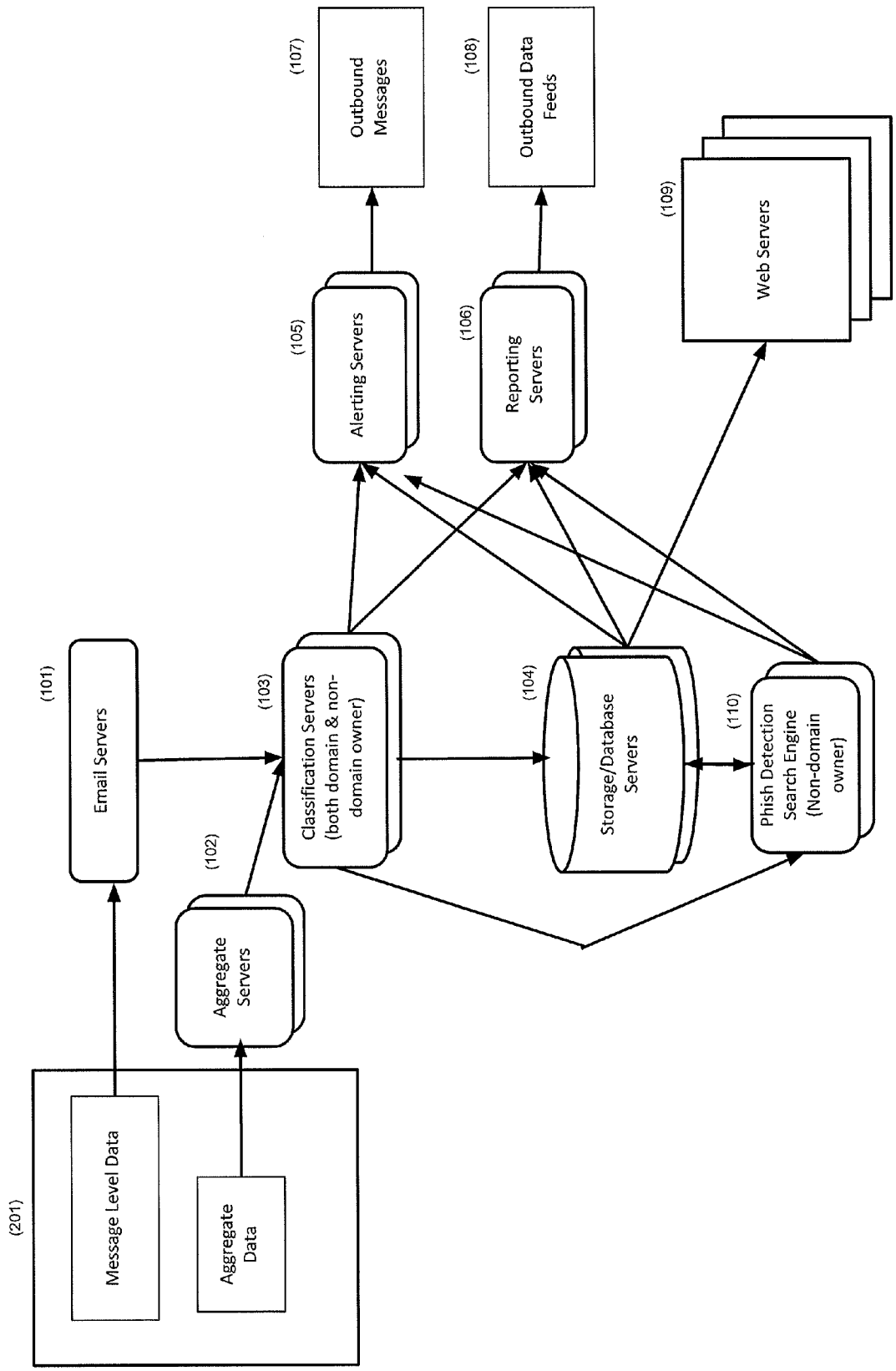
FIG. 1 provides a high level view of the system architecture.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

System Overview

Referring now to FIG. 1, the system is shown having email servers (101), aggregate report servers (102), servers (103), storage/database servers (104), Phish Detection Search Engine (110), reporting servers (106) and alerting servers (105). Each of those components of the system may include one or more computers or computing devices having one or more processors, and located at one or more local or remote locations, to perform various functions and operations in accordance with the invention. The computer or computing device may be, for example, a mobile device, personal computer (PC), server, or mainframe computer. In addition to the processor, the computer hardware may include one or more of a wide variety of components or subsystems including, for example, a co-processor, input device (such as a keyboard, touchscreen, and/or mouse), display device (such as a monitor or touchscreen), and a memory or storage device such as a database. All or parts of the system and method can be implemented at the processor by software or other machine executable instructions which may be stored on or read from computer-readable media for performing the methods described. Unless indicated otherwise, the method is preferably implemented automatically by the processor in real time without delay. Computer readable media may include, for example, hard disks, floppy disks, memory sticks, DVDs, CDs, downloadable files, read-only memory (ROM), or random-access memory (RAM).

Figure 2:
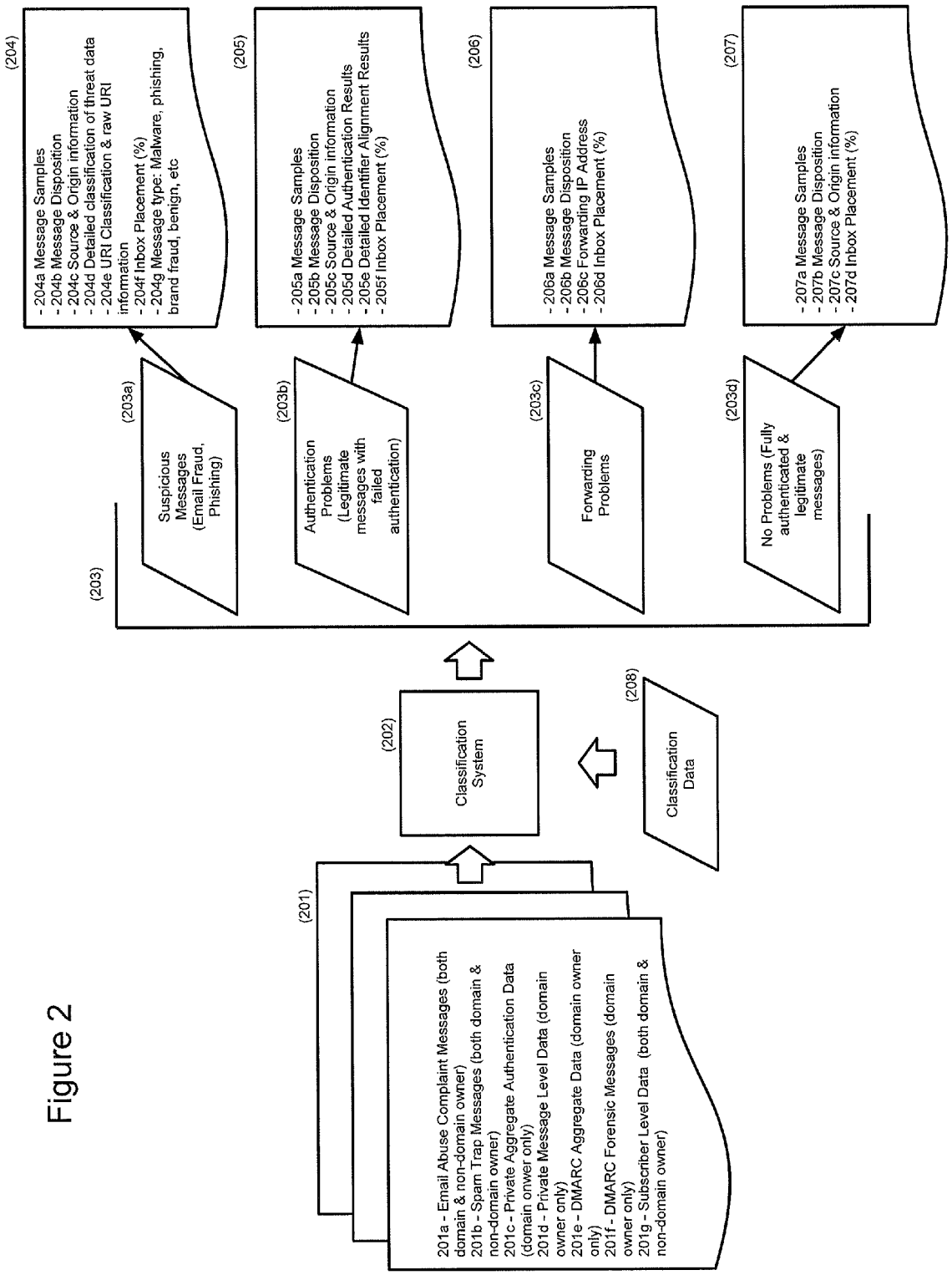
FIG. 2 demonstrates the end-to-end system of classification of data streams to outputs.

As shown in FIGS. 1 and 2, the email servers (101) receive various types of data (201) including Complaint (201*a*), Spam Trap (201*b*), Private Message Level (201*d*), DMARC Forensic Message (201*f*) and Subscriber Level Data (201*g*) for processing from ISPs, Email Mailbox providers or Subscriber Level Data Sources. The Aggregate servers (102) also receive several types of data (201) including Private Aggregate (201*c*) and DMARC Aggregate (201*e*) for processing from ISPs or Email Mailbox providers.

The Classification servers (103) continuously receive Message Level data including Email Abuse Complaint Messages (201a), Spam Trap Messages (201b), Private Message Level data (201d), DMARC Forensic Messages (201f) and Subscriber Level Data (201g) from the email servers (101) as a set of parsed email fields including the full text of the email. The parsed email fields are FROM DOMAIN, SENDING IP ADDRESS (sometimes referred to as SOURCE IP ADDRESS), MFROM DOMAIN, DKIM DOMAIN, AUTHENTICATION RESULTS header, RECEIVED_SPF header, SUBJECT, and a list of URLS contained in the email body. The classification servers (103) then classify the Message Level Data including Email Abuse Complaint Messages (201a), Spam Trap Messages (201b), Private Message Level data (201d), DMARC Forensic Messages (201f) and Subscriber Level Data (201g) in real time (FIGS. 2 and 3, at 202) into one of four categories as the data arrives into the classification sever (103): Suspicious (203a), Authentication Problems (203b), Bad Forwarding (203c) and No Problem (203d) and store the results in the storage/data base servers (104).

The Classification servers (103) receive aggregate data including Private Aggregate Authentication Data (201c) and DMARC Aggregate data (201e) from the aggregate servers (102) as a set of parsed fields. These fields are parsed by the ISP or mailbox provider and sent to the aggregate servers (102) in lieu of the full message to reduce the storage and transit costs for the ISP or mailbox provider data partner. The parsed email fields are FROM DOMAIN, SENDING IP ADDRESS, MFROM DOMAIN, DKIM DOMAIN, DKIM RESULT, SPF RESULT and a COUNT of messages. This aggregate data including Private Aggregate Authentication Data (201c) and DMARC Aggregate data (201e) is typically sent once per day from each ISP or Mailbox provider. The aggregate data including Private Aggregate Authentication Data (201c) and DMARC Aggregate data (201e) contains a count of all messages with the unique parsed email fields over a 24 hour period reported by DMARC or Private Channel parties including ISPs and Mailbox providers.

The classification servers (103) perform hourly processing on aggregate data including Private Aggregate Authentication Data (201c) and DMARC Aggregate data (201e) received from the aggregate servers (102), and output the data into one of four categories: Suspicious (203a), Authentication Problems (203b), Bad Forwarding (203c) and No Problem (203d). The data is then inserted into the storage/database servers (104). The data from the Classification Servers (103), and the Storage/Database servers (104) including both Aggregate and Message Level Data can also be displayed in the Web Servers (109) as the Classification Servers (103) completes each processing step.

The Phish detection Search Engine (110) uses a distributed search system to detect Phishing/spoofing on but not limited to MAIL_FROM, SUBJECT LINE, MESSAGE BODY and URLS for domains not owned by a customer. The Phish detection Search Engine (110) depends on non-domain data (201) including Email Abuse Complaint Messages (201a), Spam Trap Messages (201b) and Subscriber Level Data (201g). The Phish Detection Search Engine (110) processes data in real time from the Classification Servers (103) and provides results to the Alerting Servers (105) and Reporting Servers (106). Additionally, the Phish Detection Search Engine (110) does scheduled and ad hoc searches against the data set stored by category in the Storage/Database Servers (104). The real time, scheduled and ad hoc searches are stored in the Storage/Database servers (104) and displayed in the Web Servers (109) in real time.

The storage/database servers (104) store all data from the classification servers (103) and the Phish Detection Search Engine (110).

The alerting servers (105) continuously receive and examine (in real-time) the data from the Classification Servers (103), the Storage/Database Servers (104) and the Phish Detection Search Engine (110) for user defined events, such as but not limited to the number of Suspicious messages over a user defined threshold in a user specified time period, and send messages (107) to users detailing the event, including by not limited to an email, SMS, iOS alert, Android alert. The Reporting servers (106) continuously receive and examine (in real-time) the data from the Classification Servers (103), the Storage/Database Servers (104) and the Phish Detection Search Engine (110) and provide reports (108) including but not limited to URL feeds and Domain Blacklists to third parties including but not limited to clients, partners, ISPs, Mailbox Providers and Security Take Down Vendors.

Referring to FIG. 2, operation of the system is shown. The system provides real-time classification of email traffic into several categories, differential analysis of authentication outcomes between receiving networks, and the publishing of streaming data and meta-data to external systems for forensic analysis and alerting. The classification system (202) is based on an algorithm that evaluates several dimensions of an email message, in real-time.

The invention includes one or more data source inputs (201), classification system (202), classification data (208), categories (203), and outputs (204)-(207). The Classification system (202) assigns the relevant category (203) representing a specific state of the data based on the logic (202) shown in FIG. 3. The Classification system (202) is implemented by one or more of the classification servers (103). The Classification data (208) supplements logic in the Classification system. The outputs (204) of each category reflect what information is deemed valuable from the category (203). For example, messages categorized as Suspicious (203a) are most likely to contain a phishing attack with a malicious URL, therefore the Suspicious Message category output (204) contains URL information from a message. However, it's not useful to provide URL information for an Authentication Problem message (203b) because the classification system identified the message as an email originating from a customer from domain which will not contain malicious URL content. Instead, the output for Authentication Problems (205) contains detailed authentication results (DKIM, SPF and identifier alignment) that a customer will find useful to understand authentication problems on their mail server(s).

The Classification Data (208) contains Customer Data (302) which comprises a list of FROM DOMAINs acknowledged to be owned by customers and an associated list of IP ADDRESSES owned and authorized to send for each customer. The list of FROM DOMAINs and authorized IP ADDRESSES is maintained by customers and Return Path Inc. using the UI provided by the Web Servers (109). The Classification Data (208) also contain the Known Forwarder List (303). The Known Forwarder list (303) is a list of IP addresses of known good email forwarders such as common popular webmail providers including but not limited to Yahoo!, Microsoft Hotmail/Outlook, AOL and Gmail. To determine which of the forwarders are "good" as defined above Return Path, Inc. also considers IP Address reputation data to determine inclusion on the Known Forwarder List (303). One list for IP Address reputation is SENDER SCORE, offered by Return Path Inc. (see senderscore.org/), which is hereby incorporated by reference. Sender Score evaluates the reputation of billions of IPs and scores IPs on a scale of 0-100. The Known Forwarding IP Address list can also be retained, such as having domain reputation data that is derived from publicly available domain blacklists. The list of Known Forwarding IP Addresses can be any suitable list, such as the one maintained by Return Path Inc.

The data sources (201) that feed into the system originate from a variety of sources, such as those discussed above with respect to the Background of the Invention. As shown in FIG. 1, there are two types of data (201), Message Level Data and Aggregate Data. Turning back to FIG. 2, Message Level Data includes Email Abuse Complaint Messages (201a), Spam Trap Messages (201b), private message level data (201d), DMARC Forensic Message (201f), and Subscriber Data (201g). Aggregate Data includes Private Aggregate Authentication Data (201c) and DMARC Aggregate Data (201e).

At step (202), the data (201a-g) from the sources is classified. Classification is performed by the Classification Servers (103). Each source of data (201a-g) provides a different view of data and has a unique format. Consequently, the Classification System (202) must have present in the source data (201) the two common elements FROM DOMAIN and SENDING IP ADDRESS. The FROM DOMAIN is important because it identifies the purported sender of the email and enables the Classification System (202) to compare the FROM DOMAIN in the email to a known list of customer FROM DOMAINs stored in the Classification data (208). The SENDING IP ADDRESS indicates which MTA (Message Transfer Agent) sent the email. The SENDING IP ADDRESS enables the Classification System (202) to determine if the email was sent by a customer owned IP ADDRESS stored in the Classification Data (208). Source data (201) without the FROM DOMAIN and SENDING IP ADDRESS elements cannot be analyzed in the Classification System (202) and is consequently discarded. That data is removed from the system and is not available to the end user.

The presence of the following elements in the data DKIM RESULT, DKIM DOMAIN, SPF RESULT, MAIL FROM DOMAIN, EMAIL BODY CONTENT and EMAIL BODY URL CONTENT allows for classification by the Classification System (202) into Suspicious Messages (203a), Authentication Problems (203b), Forwarding Problems (203c) and No Problems (203d). If these elements are missing the data will be classified as Suspicious Messages (203a).

Figure 3:
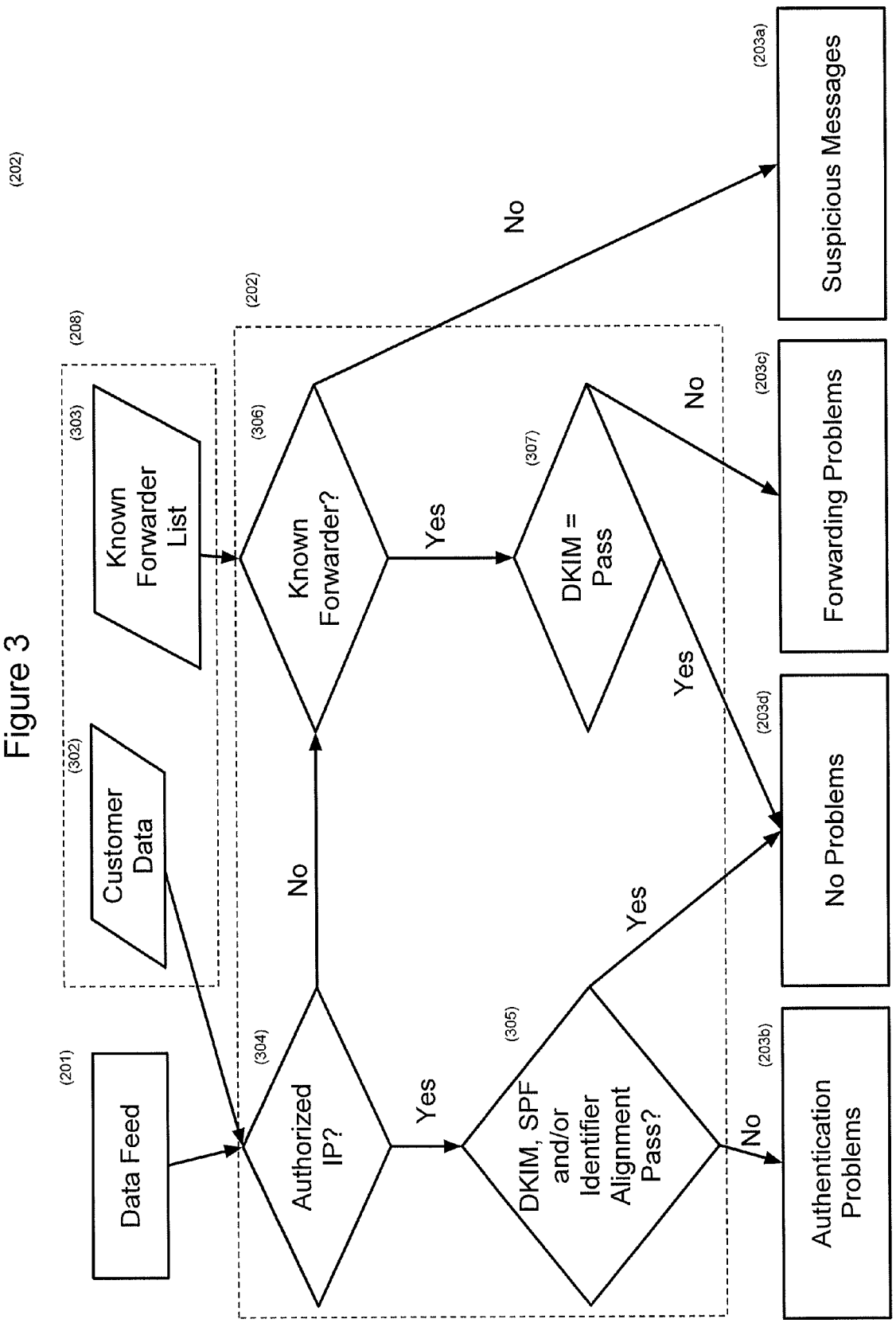
FIG. 3 details the state machine embedded in the Classification System.

Operation of the Classification System (202) will now be discussed with respect to FIG. 3. The Classification system (202) running on the Classification Servers (103) evaluates all of the data received from the sources (201) with customer data (302) and the Known Forwarder list (303) against a set of classification decisions.

The Classification System (202) begins with the Authorized IP check (304). This step examines the FROM DOMAIN and the SENDING IP ADDRESS of the email. The Classification System (202) looks for the FROM DOMAIN in the customer data (302). If the FROM DOMAIN is found in the customer data (302) then the Classification System (202) looks up all the authorized SENDING IP ADDRESSES for that FROM DOMAIN. If the SENDING IP ADDRESS from the email matches one of the authorized SENDING IP ADDRESSES then the message is sent to the Authentication check (305). If the FROM DOMAIN is not found in the customer data (302) or the SENDING IP ADDRESS is not in the list of authorized SENDING IP ADDRESSES for the FROM DOMAIN then the email is sent to the Known Forwarder check (306).

The Authentication check (305) examines the DKIM, SPF and Identifier Alignment results. For Message Level Data provided by Email Abuse Complaint Messages (201a), Spam Trap Messages (201b), private message level data (201d), DMARC Forensic Messages (201f), and Subscriber Data (201g); the DKIM RESULT is extracted from the AUTHENTICATION-RESULTS header or DKIM-RESULT header included in the original email. For Message Level Data provided by Email Abuse Complaint Messages (201a), Spam Trap Messages (201b), Private Message Level Data (201d), DMARC Forensic Messages (201f), and Subscriber Data (201g); the SPF RESULT is extracted from the RECEIVED-SPF header or the AUTHENTICATION-RESULTS header including the original email.

For Message Level Data provided by Email Abuse Complaint Messages (201a), Spam Trap Messages (201b), Private Message Level Data (201d), DMARC Forensic Messages (2011), and Subscriber Data (201g); the Identifier Alignment Result is determined by comparing the values of the FROM DOMAIN, MFROM DOMAIN and DKIM DOMAIN. If all three domain's match exactly the Alignment Result is a pass; otherwise, if there is any difference it's considered a failure. For Aggregated data provided by Private Aggregate Authentication Data (201c) and DMARC Aggregate Data (201e), the DKIM RESULT and SPF RESULT are provided as part of the aggregate data. For Private Aggregate Authentication Data (201c) and DMARC Aggregate Data (201e); the Identity Alignment checks are determined exactly like Message Level Data discussed above. If all Authentication Checks, DKIM, SPF and Identity Alignment pass the email processing is complete and the email is sent to the No Problem category (203d). If any of the Authentication Checks return a value other than pass, processing is complete and the email is sent to the Authentication Problems category (203b).

The Known Forward check (306) examines the SENDING IP ADDRESS of the email. If the SENDING IP ADDRESS is found in the Known Forwarder List (303) the email is sent to the Forwarder DKIM check (307). If the SENDING IP ADDRESS is not found in the Known Forwarder List (303) processing is complete and the email is sent to the Suspicious Messages category (203a).

The Forwarder DKIM check (307) examines the DKIM Result of the email. For Message Level Data provided by Email Abuse Complaint Messages (201a), Spam Trap Messages (201b), Private Message Level Data (201d), DMARC Forensic Messages (201f), and Subscriber Data (201g); the DKIM RESULT is extracted from the AUTHENTICATION-RESULTS header or DKIM RESULT header in the original email. For Aggregated data provided by Private Aggregate Authentication Data (201c) and DMARC Aggregate Data (201e); the DKIM RESULT is provided in the aggregate data. If the DKIM Result is a pass, processing is complete and the email is sent to the No Problem category (203d). If the DKIM Result is a not pass, processing is complete and the email is sent to the Forwarding Problems category (203c).

Thus, the classification system outputs each message data point into one of several categories (203a-d). Those categories (203a-d) form the basis for the display of data in a web interface. All data elements are displayed in a user interface provided by the web servers 109 and certain data from the categories are streamed (107, 108) to external systems. Illustrative, non-limiting examples of the categories (203a-d) are shown as blocks (204-207). For instance, several examples of the suspicious messages category (203a) are shown at block (204). The Suspicious Messages category (203a) highlights fraudulent message activity. Messages found here originated from an IP address that hasn't been authorized to send for the sender's domain, based on SPF authentication check, and are most often the result of domain spoofing. Thus, examples of suspicious messages (203a) include message samples (204a), message disposition (204b), source and origin information (204c), detailed classification of thread data (204d), and URI classification and URI information (204e).

In addition to the two types of data (201), Message Level Data and Aggregate Data, the data can be applied in two different ways, namely: data about phishing attacks claiming to originate from customer owned domains (referred to generally here as "domain phishing") and data about phishing attacks designed to resemble customer brands/identities originating from domains not owned by the customer (referred to generally here as "non-domain phishing"). The processing of the data in FIGS. 2 and 3 does not change regardless of whether the system is looking at domain phishing or non-domain phishing. However, different originating data sources (201) are used to enable each type of phishing. Email Abuse Complaint Messages (201a), Spam Trap Messages (201b), Private Aggregate Authentication Data (201c), Private Message Level Data (201d), DMARC Aggregate Data (201e), DMARC Forensic Messages (201f), and Subscriber Data (201g) provide information about phishing attacks on customer owned domains. Email Abuse Complaint Messages (201a), Spam Trap Messages (201b), and Subscriber Data (201g) provide information about phishing attacks on customer brands/identities originating from domains not owned by the customer.

The Phish Detection Search Engine (110) searches all categorized data (203a-d) stored on the Storage/Database Servers (104) for the EMAIL BODY CONTENT and EMAIL BODY URL CONTENT. The EMAIL BODY CONTENT includes, but is not limited to, the full FROM HEADER, DISPLAY NAME, SUBJECT LINE, EMAIL BODY and associated ATTACHMENTS. The Phish Detection Search Engine (110) also searches all categorized data (203a-d) in real time from the Classification servers (103). The Phish Detection Search Engine (110) also searches the data noted above for the use of display names, trademarks and other terms that may or may not be trademarked by the domain owner for use of their brand in phishing and spoofing attacks. An example of the distinction is the ownership of bigbank.com by the company Bigbank. The domain classification system (202) described above (FIGS. 2, 3) determines whether the mail originating from bigbank.com domain that is owned by bigbank.com is legitimate (203d) or whether it is suspicious (203a).

The non-domain phishing aspect of the invention can also determine if people are purporting to send mail from Bigbank on a domain or domains that are not owned by Bigbank and allow the end users at Bigbank to take action. This is done by excluding all legitimate email (203b, 203d) sent from known Bigbank domains and then looking for Bigbank copyrights, trademarks and other terms related to Bigbank's business in the remaining Suspicious Messages (203a) and Forwarding Problems (203c) data. Email Abuse Complaint Messages (201a), Spam Trap Messages (201b), and Subscriber Level Data (201g) is used to find non-domain phishing. The classification data (203) is used to narrow the data set into most likely to be true phishing attacks and reduce false positives. And the customer data (302) is used to determine ownership of domains and IPs therefore reducing false positives. Further the classification system can find mail saying in the display name it's coming from "Bigbank Processing" with the domain of otherdomain.com which is not owned by Bigbank. This non-domain phishing and spoofing can then be shown in the UI alongside the existing phishing and spoofing from domains owned by Bigbank in FIGS. 4-9.

In addition to displaying the non-domain phishing data in the user interface, the non-domain phishing data is also stored in the Storage/Database Servers (104) and sent to both the Alerting servers (105) and Reporting Servers (106). This allows the system to combine both the domain and non-domain phishing attacks together if necessary or leave the non-domain phishing attacks separate and send appropriate outbound messages (107) including by not limited to an email, SMS, iOS alert, Android alert to users detailing the event and include it in the outbound data reports (108) including but not limited to URL feeds and Domain Blacklists to third parties including but not limited to clients, partners, ISPs, Mailbox Providers and Security Take Down Vendors.

The data from the Storage/Database Servers (104) is retrieved by the Web Servers (109) by LAN connection if they reside in the same data center and can also be retrieved by the Web servers (109) over TCP/IP and transmitted across the internet. The data is retrieved when a customer logs into the web interface on the Web Servers (109).

Figure 4:
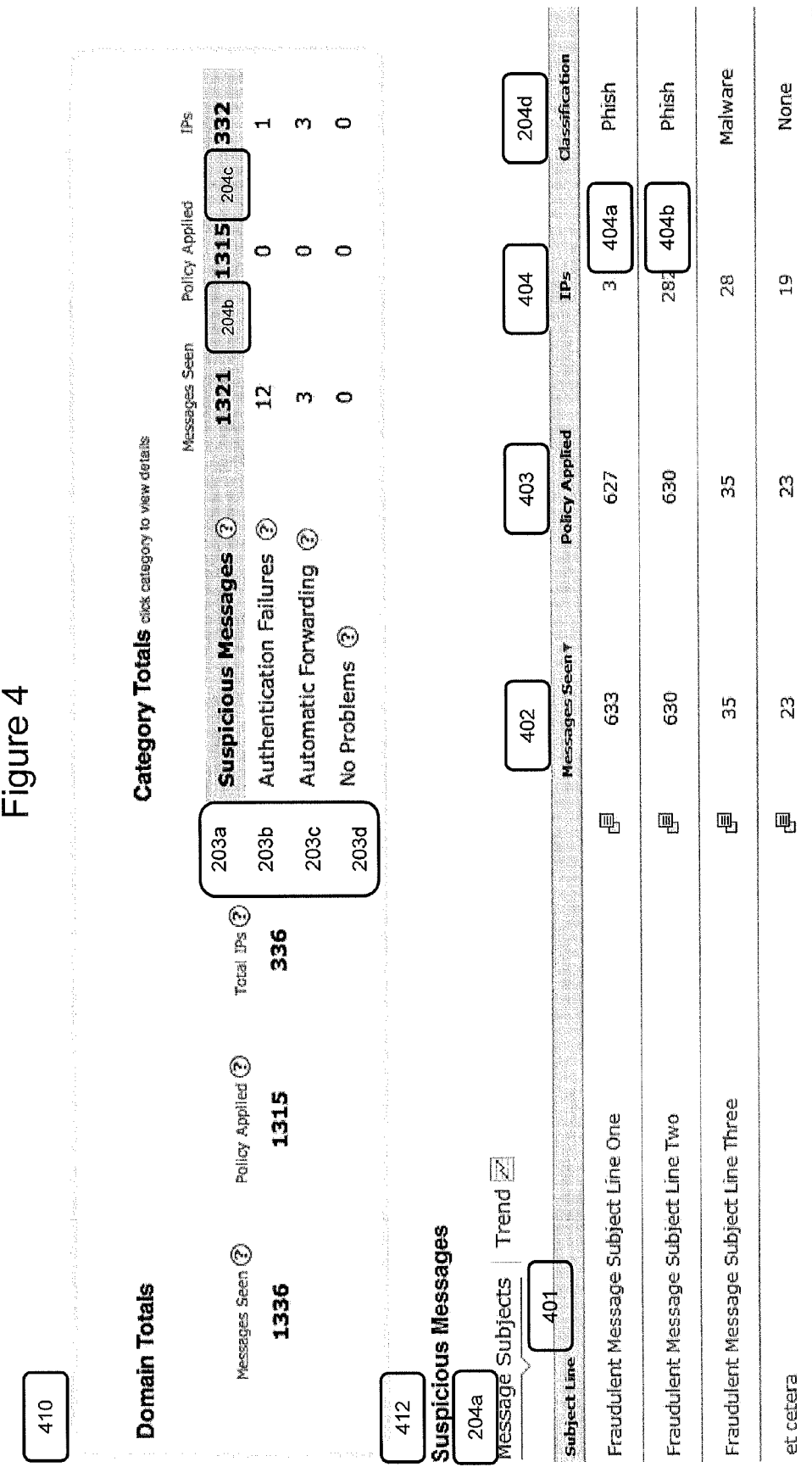

Referring to FIG. 4, an annotated image screenshot of the user interface is shown. The display has an output summary section (410) and an output detail section (412). The output summary section (410) has domain totals on the left and category totals on the right. FIG. 4 demonstrates one illustrative, non-limiting embodiment of how categories (203) can be displayed by the web servers (109).

Figure 6:
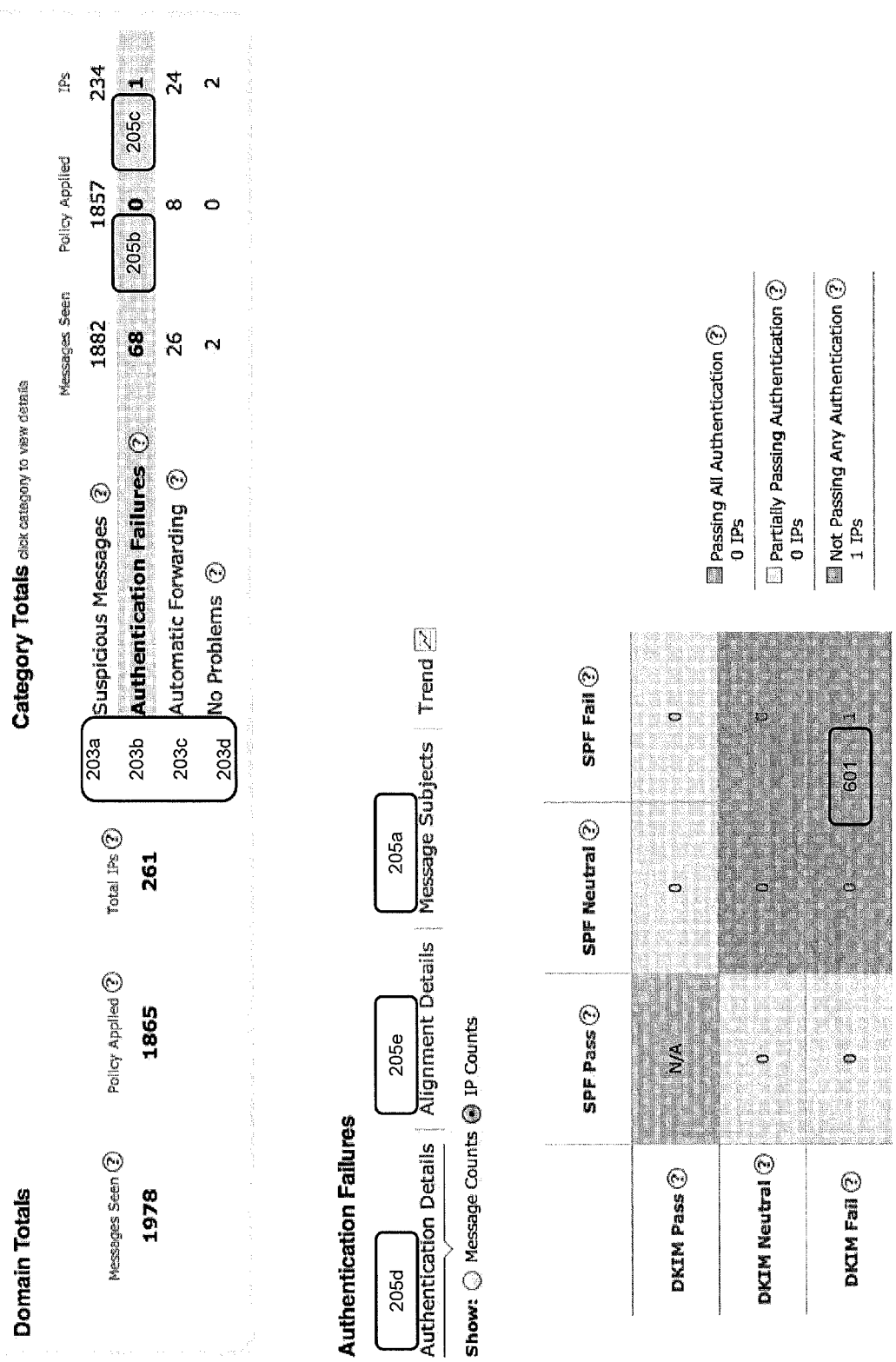
Figure 8:
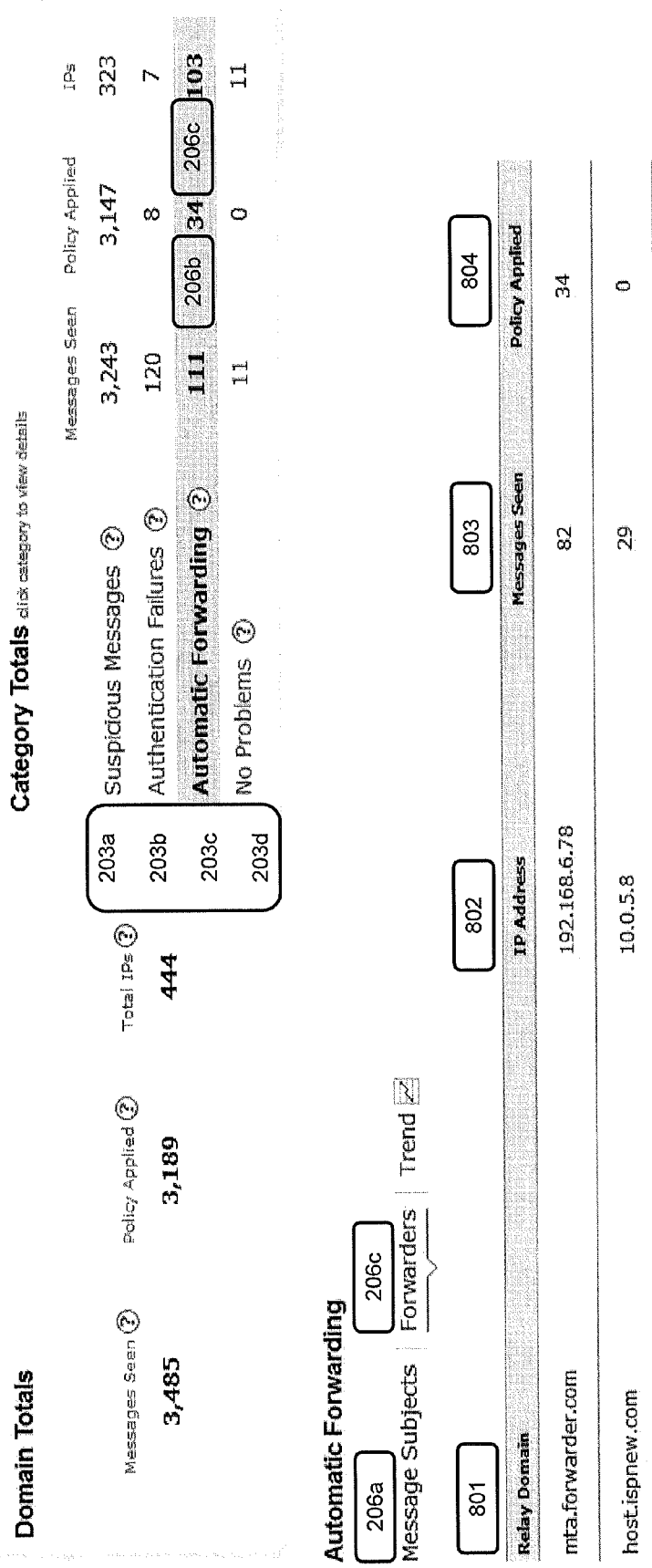
Figure 9:
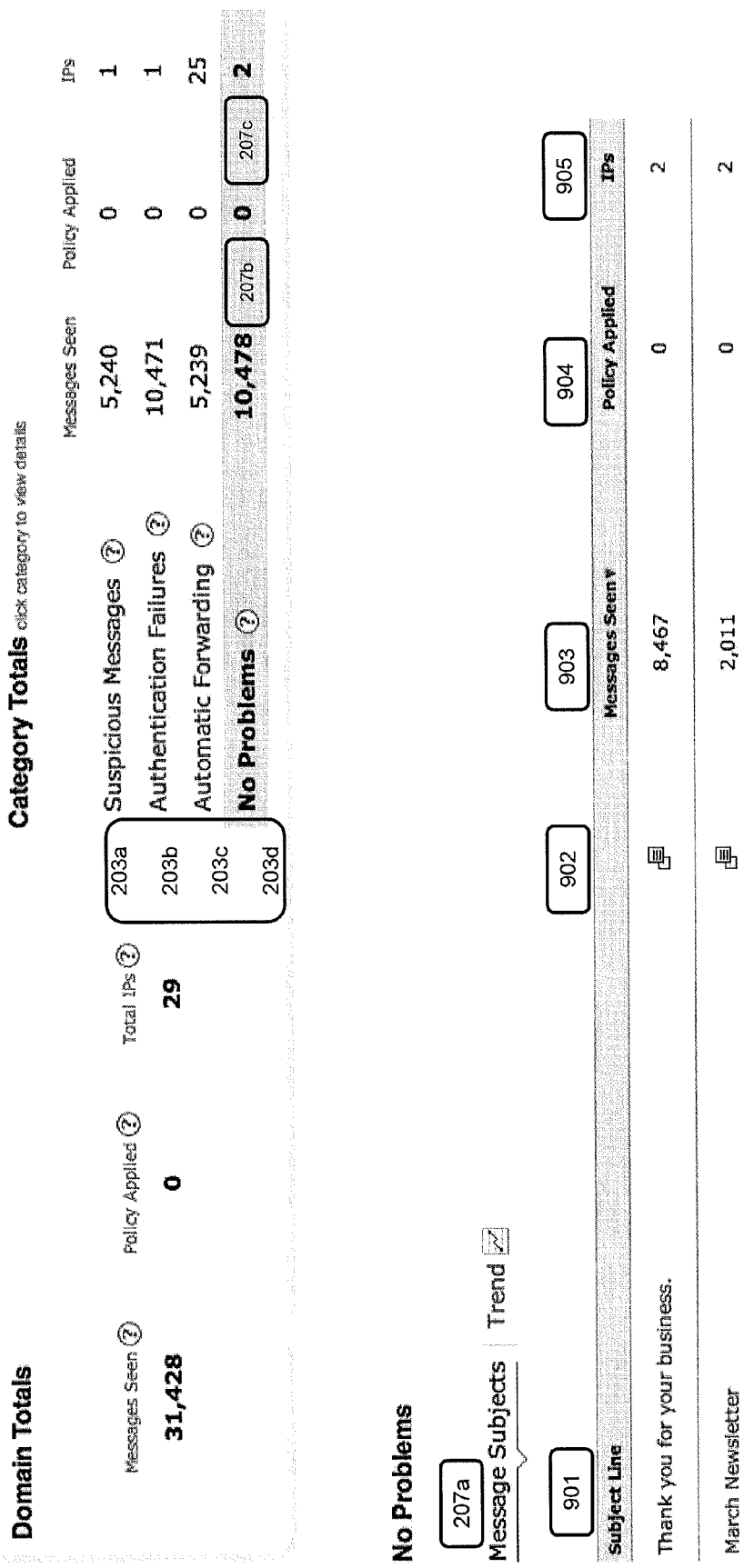

The detailed output section (412) can display further information about the various categories (203a-d) shown in the output section (410). As the user selects each category (203a-d) from the output section (410), the relevant details are displayed in section (412). Message Subjects area of the user interface lists all the email messages in the category grouped by subject line in the column labeled "Subject Line" (204a). FIG. 4 shows the details of the Suspicious Messages category (203a), FIGS. 6-7 show the details of the Authentication Failures category (203b), FIG. 8 shows the details of the Automatic Forwarding category (203c), and FIG. 9 shows the details of the No Problems category (203d).

The bottom portion of FIG. 4 shows the Suspicious Messages (203a) output (412) and details (402-404). These details inform users about fraudulent messages and their origin to allow the end users to take action. Additional details in the output section can be shown which include classification (204d) of the varieties of fraud, including malware, phishing, or spam to further refine the risk category of the suspicious message, and the priority needed to take action. Another example might include high, medium or low instead of the classifications (204d) shown in FIG. 4. The details shown in display section (412) are the output of the Suspicious message category (203a) for the end user of the system (customer not ISP) to be able to take action.

The classification system (202) determines if a message is deemed suspicious. The subject line is used to group the messages that contain the exact same subject line and that have been deemed suspicious so the end user can easily take action. One example is an actual message sent from the domain owner that is not authenticating correctly. This would allow the domain owner to quickly identify and get authentication in place. Alternatively it could be also be quickly clear it's not a message and sent by the domain owner and they can take immediate action to remove if they do not have a proactive blocking policy.

The "Message Subjects" area (412) of the user interface contains a column titled "Policy Applied" (403). This column is a count of the number of times a Reporting ISP or Receiving System applied a policy to the email message. For instance in FIG. 4, the number 627 is the number of messages that the ISP partner(s) took action on the message (rejected or placed in the spam folder for example) that contained the subject line "Fraudulent Message Subject Line One" The result of the policy as determined by the ISP or Mailbox provider is referred to as the message disposition (204b).

Source and Origin Information (204c) is also shown in FIG. 4. The IP Addresses of data in the Suspicious Messages category is useful to understand where the suspicious email originated. In the "Domain Totals" area of the interface contains a column titled "IPs" (404). The value in the column is the number of unique IP Addresses that sent the email message. As one embodiment of the invention, the number links to detailed IP Address information (501), examples include but are not limited to the following fields shown in FIG. 5: rDNS hostname (502), IP reputation information (such as Return Path SenderScore) (504), geographic location of IP Address (505), the MAIL FROM (506) and the option to display a sample message from each IP Address (507). The SenderScore is a reputation score generated by Return Path, Inc. Single IP lookups are available on http://SenderScore.org (the contents of which are hereby incorporated by reference) to determine if the IP has an IP reputation problem. It can help the end user determine if the message is a legitimate message or an attack. Typically legitimate messages have a higher reputation score (i.e., SenderScore) than an attack.

For instance as shown in FIG. 4, there are 3 IPs (404a) that sent the first fraudulent message, titled 'Fraudulent Message Subject Line One' and 282 IPs (404b) that sent the second fraudulent message, titled 'Fraudulent Message Subject Line Two'. Each email message entry is formatted as a link that accesses further information on the message, such as that shown in FIG. 5. The IP details in FIG. 5 as described above allow the user to quickly determine if the email message is a legitimate message that isn't authenticated properly or an attack. An attack could have a large number of IP addresses in the hundreds or thousands for example indicating it's coming from a wide variety of compromised machines such as in a botnet attack. This is one example of the way the data can be shown from (204) in a form the user can interact within the UI (FIGS. 4, 5). As further noted in the embodiment of FIG. 4, the totals of columns (402), (403) and (404) are shown in the Category Total Section (410).

FIG. 4 also shows the Detailed Classification of the threat data (204d). This classification is done by the classification system (202) and can use a variety of methods to determine risks. These methods include some of the information shown in FIG. 5 such as the Geographic location (505), the average Sender Score of the IP addresses (504) and information about the URLs in the body of the message (507) as determined by 3rd parties or separate information stored in the Storage and Database servers (104). This data set is utilized to determine the risk of any particular message and one embodiment shows that as a Phish, Malware and none (204d) to allow the end users the ability to sort and prioritize the attacks to determine which ones they should address first. At the request of the domain owner, either manually or automated, this data is available to be published to security vendors or others through the outbound data feeds (108). Included data elements that can be sent are pulled from the Storage/Database servers (104) and could include but are not limited to the information outputted from the Classification System (202) which are classified as suspicious (203a) and are displayed to the user and stored in the system (204) including Source IP and origin information (204c), ISP or Mailbox provider, Message Samples (204a), Message Disposition (204b), Detailed classification of mail threat data (204d), URI classification and raw URI information (204e), Inbox Placement (204f) and Message Type (204g).

Clicking on Authentication Failures FIG. 4 (203b) brings the user to the page as displayed in FIG. 6. Turning to FIG. 6, the next category Authentication Failures (203b) highlights problems with SPF and/or DKIM authentication from messages originating from your sender authorized IPs, including authorized vendors such as an Email Service Provider or hosted email delivery platform. The data is intended to help identify which servers or IPs are either missing or failing SPF and DKIM authentication. The authentication problems (205) are for email traffic originating from a domain owner's authentic sending infrastructure but are demonstrating one or more problems with SPF, DKIM, or domain identifier alignment. This category allows for troubleshooting of one's email sending infrastructure. As with the suspicious messages (203a), the Authentication Problems (203b) has message samples (205a), message disposition (205b), source and origin information (205c), detailed authentication results (205d), detailed identifier alignment results (205e) and Inbox placement (%) (205f).

In one embodiment clicking on the Message Subjects (205a) provides a list of all the email messages in the category grouped by subject line. This would be identical to the bottom portion of FIG. 4 (412) which are shown in columns (401-404) being present in section (412). The Classification column (204d) would not exist if you have selected Authentication Failures (203b).

FIG. 6, detailed Authentication Results (205d) is a summary of the DKIM and SPF results, presented in a grid with DKIM results on the y axis and SPF results on the x axis. This provides a matrix of result combinations to the user. In each intersecting box is the count of email messages or a count of SENDING IP ADDRESSES. Clicking the number of IPs (601) links to FIG. 5 which includes detailed IP Address information, specifically highlighting the rDNS hostname (502), Return Path Senderscore (504), geographic location of IP Address (505) and the option to display a sample message from each IP Address (507).

Referring to FIG. 7, detailed Identifier Alignment Results (205e) is a list of email messages grouped by FROM DOMAIN, DKIM DOMAIN and MAIL FROM DOMAIN (701), including a count of messages (702), a count of policy applied (703) and a count of IPs (704). If either the DKIM DOMAIN or MAIL FROM DOMAIN does not match the FROM DOMAIN, the unmatched element can be highlighted as an Identifier Alignment failure (705).

Turning to FIG. 8, the automatic forwarding messages category (203c) includes message samples (206a), message disposition (206b), and forwarding IP address (206c) information. Message Samples (206a) is a list of all the email messages in the category grouped by subject line. Message Disposition (206b) is the number of times a Reporting ISP or Receiving System applied a policy the email message. The forwarding IP Address (206c) information contains a rDNS result (801), the offending forwarding IP Address (802), the count of messages seen from the forwarding IP Address (803) and the number of messages where policy was applied to email sent from this forwarding IP Address (804).

Automated forwarding (203c) highlights messages that are authentic but have failed SPF and/or DKIM authentication due to an automatic forwarding action. Messages in the Automatic Forwarding category on the surface appear to be fraudulent because they come from an IP source not operated by the domain owner; however this is not always a case for concern. Many mailbox providers offer a service that allows a user to configure a rule to forward their email to a different account. Because the email is now coming from the forwarding provider's IP address but still appears to be coming from the domain owner's sending domain, it appears fraudulent, but is actually not. The domain owner is encouraged take action to communicate with the owner of the forwarding IP Address (801, 802) to discuss the DKIM failures on the network of the forwarding IP Address.

Turning to FIG. 9, Messages in the No Problems category (203*d*) fall into one of 2 classes. The first class comprises messages that originated from the domain owner's authorized IP(s) and passed SPF, DKIM and Identify Alignment checks. The second class comprises messages that passed DKIM checks and passed through a known good forwarder. No problems detected (203*d*) serves as a verification category that all traffic is fully authenticated and passing all authentication verification checks. Information in this category (203*d*) includes message samples (207*a*), message disposition (207*b*), and source and origin information (207*c*). FIG. 9 Message Samples (207*a*) is a list of all the email messages in the category grouped by subject line (901). Message Disposition (207*b*) is shown by the column Policy Applied (904) and is the number of times a Reporting ISP or Receiving System where policy was applied to email sent from this IP Address. The result of the policy is referred to as the message disposition.

Source and Origin Information (207*c*) is shown by the column "IPs" (905) the count of unique IP Addresses, which sent the email message. As one embodiment of the invention, the number links to detailed IP Address information (501). Examples include but are not limited to the following fields shown in FIG. 5: rDNS hostname (502), IP reputation information (such as Return Path SenderScore) (504), geographic location of IP Address (505), the MAIL FROM (506) and the option to display a sample message from each IP Address (507).

ISP Report by Source

Using data from the categories Authentication Problems (203*b*) and No Problems (203*d*), the present invention also provides differential analysis of authentication results by ISPs as shown in FIG. 10. These results are provided by the Web Severs (109) and accessed by the customer to determine if there is a different authentication result at one or more ISPs or Mailbox Providers. Often within receiving email networks, individual networks, MTAs and receiving destinations demonstrate variance in how authentication signatures are treated and verified. Thus, the invention employs a mechanism to analyze and visualize email authentication results by sending IP, sending domain, receiving domain, receiving IP, and receiving MTA for the purposes of identifying discrepancies and variance between authentication verifiers, even within a single network of receiving servers. The advantage is that this allows one view across all ISP or Mailbox Provider results to easily determine if there is different behavior that may not be easily determined with the total authentication results as shown in FIGS. 4-9.

One example of differential analysis of authentication results is variance in DKIM or SPF verification practices across individual MTAs within a receiving network. Often there are MTAs within a receiving network numbering in the hundreds or thousands. It is common for individual MTAs to possess different technology packages for verifying DKIM and SPF authentication. Thus, even when a domain owner sends to a single destination email domain, authentication results may vary. When observed, supplying this information to the domain owner allows the domain owner to understand why and where there are authentication failures that may or may not be within the domain owner's control. Referring to FIG. 10, this example can be shown by examining the DKIM Pass rate (1001) authentication results for domain.com and www.domain.com. Domain.com is passing DKIM at Google at a rate of 85.9% (1002); however, www.domain.com is passing DKIM at Google with a rate of 100% (1004). This shows the customer that they are doing something different between domain.com and www.domain.com that is causing some portion of the mail sent to Google from domain.com to not be properly authenticated.

Another example of differential analysis is variance in DKIM or SPF verification practices across receiving networks. This is the same concept as above, but instead of within a single network the same problem persists across networks. For example, receiving network A may possess entirely different authentication verification technology than receiving network B, this it is common to experience variances in authentication results even when a domain owner is following published guidelines (RFC specifications.) As a domain owner, having this information greatly reduces troubleshooting time and allows them to configure different authentication signing policies and practices depending on the receiving network. The variance data are presented graphically and in data tables to quickly isolate variance-contributing authentication verification points. Referring to FIG. 10. This example can be shown by examining the DKIM Pass rate (1001) authentication results for domain.com. Domain.com is passing DKIM at Google at a rate of 85.9% (1002); however, domain.com is passing DKIM at XS4ALL with a rate of 97.24%. This shows the variance in authentication results between Google and XS4ALL for the same domain.

SUMMARY

The classification output categories are distinctive. Each category is a concise, actionable bucket of information that provides a distinct corrective action path. Suspicious messages equals threat mitigation action, Authentications Failures equals corrective action within the sending infrastructure. Forwarding details authentication failures that would result in a blocked message should the domain be asserting a blocking policy following DMARC standard or private registry. The result is legitimate email messages being blocked, so the domain owner needs to be aware of the relative risk of stopping fraud versus collateral damage. No problems equals the rest of the denominator in traffic make-up percentages to gauge the relative impact of all other problems identified.

The present invention compares authentication verification accuracy by mailbox provider. This information is invaluable (1) to diagnose authentication problems that may or may not be within a domain owner's control and (2) allows a domain owner to see what legitimate email messages may be subject to policy-blocking at one mailbox provider but not another. This allows the domain owner to assert different blocking policies at different mailbox providers.

One feature of the present invention is the combining of DMARC-sourced data with other threat data sources (traps, complaints, etc). We take all the disparate data types, from multiple providers and reduce them to the common elements and displaying it as a single source of data. Another feature of the invention is the classification output categories. Categorizing email message traffic displays the information needed to fix a network (such as authentication problems (203*b*)), the malicious traffic (Suspicious (203*a*), the legitimate messages that have failed authentication beyond my control (forwarding (203*c*)). It also highlights where everything is going well (No Problems (203*d*)). The present invention provides the information quickly and accurately. The categories allow the user to think about the problems on his/her network.

Another feature of the invention is the differential analysis of receiver authentication outcomes (message disposition). This is a very helpful diagnostic tool. The whole point of the differential analysis and the presentation of any authentication troubleshooting information is to streamline the process of identifying a particular user's (ISP's) problems, fixing them, and getting to the point where the user can enforce a blocking policy on the unauthenticated traffic. Then, the Suspicious Messages category (203a) provides the forensic analysis capabilities to isolate the source of the malicious traffic, understand the magnitude of the problem, and gather data that provides additional protection to email users (protect them from phish, etc.) and quite possibly surface data that can be used in the criminal prosecution of the malicious email perpetrator.

Another feature of the invention is the ability to provide information on non-domain phishing attacks. The only data currently being provided to brands is based on message failures for domains they own. However, non-domain phishing is a large and growing problem that cannot be solved with DMARC data and classification alone. It requires the combination of novel message level data sources (traps, complaints, subscriber data, etc) and classification to surface non-domain phishing attacks with a low degree of false positives.

It is noted that the present invention has been described for use with certain source data (201). It should be recognized that the format and structure of the data continues to change. The invention is not limited to the current data format and additional or other data can be utilized within the spirit and scope of the invention.

It is noted that the classification engine is shown (FIG. 3) and described as having four primary decision points, steps (304)-(307) and a separate phish detection engine (110). And, that those steps (304)-(307) and engine (110) have particular utility when operated together and in the sequence shown and described. It should be recognized, however, that each of the steps (304), (305), (306), (307) and engine (110) have separate utility apart from being used with each of the other steps. Each of those steps can be utilized with one or more of the other steps, by itself, or with other steps. Thus, for instance, the Authorized IP Check (304) is useful independent of the Classification System (202). The SENDING IP ADDRESSES from any email message can be processed by the Authorized IP Check (304). In combination with the Customer Data (302) the Authorized IP Check is a reliable way to determine if an email was sent by a domain owner. In addition, the Known Forwarder Check (306) Forward DKIM Check (307) are useful independent of the Classification System (202) for determining if an email message sent from a forwarding IP Address is not Suspicious.

Examples

FIGS. 11(a)-(e) each show an illustrative, non-limiting example of email messages that are processed in accordance with an embodiment of the invention. FIG. 11(a) shows an Email Abuse Complaint Message (201a) classified as Suspicious (203a). A message (1101) is received by the Email Servers (101) from an ISP or Mailbox Provider. The Email Servers (101) parse the message into a set of parsed fields: FROM DOMAIN=bigbank.com (1101a), SENDING IP ADDRESS=10.10.10.12 (1101b), MFROM DOMAIN=badguy.com (1101c), DKIM DOMAIN=badguy.com (1101d), DKIM RESULT=none (1101e), SPF RESULT=pass (1101f), COUNT=1. The Classification Servers (103) receive the parsed fields and start the Classification System (202) process FIG. 3.

The first step is the Authorized IP check (304). The FROM DOMAIN (1101a) of the message (1101), 'bigbank.com' is looked up in the customer data (302), which is illustrated in FIG. 11f, 1106. 'bigbank.com' is present and includes one Authorized Sending IP Address, 11.12.13.14. The SENDING IP ADDRESS (1101b) from the message (1101), 10.10.10.12 does not match the authorized Sending IP Address therefore the Authorized IP check result is a NO and the message moves to the Known Forwarder Check (306). In the Known Forwarder Check (306) the SENDING IP ADDRESS, from the message (1101) is looked up in the Known Forwarder List (303) defined by FIG. 11f, 1107. The SENDING IP ADDRESS, 10.10.10.12, does not exist in the Known Forwarder List (303) therefore the Known Forwarder Check returns NO. The message (1101) is classified as Suspicious (203a) and stored on the Storage/Database Servers (104) and sent to the Phish Detection Search Engine (110), Alerting Servers (105), and Reporting Servers (106) for immediate action if deemed necessary.

FIG. 11b shows a second illustrative, non-limiting example of a Spam Trap Message (201b) classified as Suspicious Messages (203a). A message (1102) is received by the Email Servers (101) from an ISP or Mailbox Provider. The Email Servers (101) parse the message into a set of parsed fields: FROM DOMAIN=badguy.com (1102a), SENDING IP ADDRESS=10.10.10.56 (1102b), MFROM DOMAIN=badguy.com (1102c), DKIM DOMAIN=badguy.com (1102d), DKIM RESULT=none (1102e), SPF RESULT=fail (1102f), COUNT=1. The Classification Servers (103) receive the parsed fields and start the Classification System (202) process. The first step is the Authorized IP check (304). The FROM DOMAIN (1102a) of the message (1102), "badguy.com" is looked up in the customer data (302), defined by FIG. 11f, 1106. 'badguy.com' is not present therefore the Authorized IP check result is a NO and the message moves to the Known Forwarder Check (306). In the Known Forwarder Check (306) the SENDING IP ADDRESS (1102b), from the message (1102) is looked up in the Known Forwarder List (303) defined by FIG. 11f, 1106. The SENDING IP ADDRESS (1102b), 10.10.10.56, does not exist in the Known Forwarder List (303) therefore the Known Forwarder Check returns NO. The message (11b) is classified as Suspicious (203a) and stored on the Storage/Database Servers (104) and sent to the Phish Detection Search Engine (110), Alerting Servers (105), and Reporting Servers (106) for immediate action if deemed necessary.

FIG. 11c show an illustrative, non-limiting example of Private Aggregate Authentication Data (201c) classified as Forwarding Problems (203c). Private Aggregate Data (1103) is received by the Aggregate Servers (102) from an ISP or Mailbox Provider. The Aggregate Servers (102) parse the data into a set of parsed fields: FROM DOMAIN=bigbank.com (1103a), SENDING IP ADDRESS=79.79.79.79 (1103b), MFROM DOMAIN=bigbank.com (1103c), DKIM DOMAIN=bigbank.com (1103d), DKIM RESULT=fail (1103e), SPF RESULT=fail (11031), COUNT=7 (1103g). The Classification Servers (103) receive the parsed fields and start the Classification System (202) process. The first step is the Authorized IP check (304). The FROM DOMAIN (1103a) in the data (1103), 'bigbank.com' is looked up in the customer data (302), defined by FIG. 11f, 1106. 'bigbank.com' is present and includes one Authorized Sending IP Address, 11.12.13.14. The SENDING IP ADDRESS (1103b) from the data (1103), 79.79.79.79 does not match the authorized Sending IP Address therefore the Authorized IP check result is a NO and the data moves to the Known Forwarder Check (306). In the Known Forwarder Check (306) the SENDING IP ADDRESS (1103b), from the message (1103) is looked up in the Known Forwarder List (303) defined by FIG. 11f, 1107. The SENDING IP ADDRESS (1103b), 79.79.79.79, does exist in the Known Forwarder List (303) therefore the Known Forwarder Check returns YES and the data is moves to the Forwarder DKIM Check (307). The DKIM_RESULT (1103e) in the data is fail therefore the Forwarder DKIM Check result is NO. The message (1103) is classified as Forwarding Problems (203c) and stored on the Storage/Database Servers (104) and sent to the Phish Detection Search Engine (110), Alerting Servers (105), and Reporting Servers (106) for immediate action if deemed necessary.

FIG. 11d shows an illustrative, non-limiting example of a Private Message Level Data (201d) classified as Authentication Problem (203b). A message (1104) is received by the Email Servers (101) from an ISP or Mailbox Provider. The Email Servers (101) parse the message into a set of parsed fields: FROM DOMAIN=accounts.bigbank.com (1104a), SENDING IP ADDRESS=11.12.13.15 (1104b), MFROM DOMAIN=accounts.bigbank.com (1104c), DKIM DOMAIN=accounts.bigbank.com (1104d), DKIM RESULT=fail (1104e), SPF RESULT=pass (11041), COUNT=1. The Classification Servers (103) receive the parsed fields and start the Classification System (202) process. The first step is the Authorized IP check (304). The FROM DOMAIN (1104a) of the message (1104), 'account.bigbank.com' is looked up in the customer data (302), defined by FIG. 11f, 1106. 'accounts.bigbank.com' is present and includes one Authorized Sending IP Address, 11.12.13.15. The SENDING IP ADDRESS (1104b) from the message (1104), 11.12.13.15 does match the authorized Sending IP Address therefore the Authorized IP check result is a YES and the message moves to the DKIM, SPF and Identifier Alignment Check (305). In the DKIM, SPF and Identifier Alignment Check (306) checks the DKIM_RESULT (1104e), SPF_RESULT (1104f) and Identifier Alignment of the message (1104). The DKIM_RESULT (1104e) is fail therefore the DKIM, SPF and Identifier Alignment Check returns NO. The message (1104) is classified as Authentication Problems (203b) and stored on the Storage/Database Servers (104) and sent to the Phish Detection Search Engine (110), Alerting Servers (105), and Reporting Servers (106) for immediate action if deemed necessary.

FIG. 11e show an illustrative, non-limiting example of DMARC Aggregate Data (201e) classified as No Problems (203d). DMARC Aggregate Data (1105) is received by the Aggregate Servers (102) from an ISP or Mailbox Provider. The Aggregate Servers (102) parse the data into a set of parsed fields: FROM DOMAIN=bigbank.com, (1105a) SENDING IP ADDRESS=11.12.13.14 (1105b), MFROM DOMAIN=bigbank.com (1105c), DKIM DOMAIN=bigbank.com (1105d), DKIM RESULT=pass (1105e), SPF RESULT=pass (1105f), COUNT=18 (1105g). The Classification Servers (103) receive the parsed fields and start the Classification System (202) process. The first step is the Authorized IP check (304). The FROM DOMAIN (1105a) in the data (1105), 'bigbank.com' is looked up in the customer data (302), defined by FIG. 11f, 1106. 'bigbank.com' is present and includes one Authorized Sending IP Address, 11.12.13.14. The SENDING IP ADDRESS (1105b) from the data (1105), 11.12.13.14 does match the authorized Sending IP Address therefore the Authorized IP check result is a YES and the data moves to the DKIM, SPF and Identifier Alignment Check (306). In the DKIM, SPF and Identifier Alignment Check (305). The DKIM_RESULT (1105e) is pass and the SPF_RESULT (1105f) is pass. The FROM_DOMAIN (1105a), "bigbank.com", the MFROM_DOMAIN (1105c), "bigbank.com" and DKIM_DOMAIN (1105d), "bigbank.com" all match therefore the Identifier Alignment result is pass. All tests pass therefore the DKIM, SPF and Identifier Alignment Check returns YES. The message (1105) is classified as No Problems (203d) and stored on the Storage/Database Servers (104) and sent to the Phish Detection Search Engine (110), Alerting Servers (105), and Reporting Servers (106) for immediate action if deemed necessary.

The foregoing description and drawings should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A classification system comprising:
a classification processing device configured to receive aggregate level data for email messages and message level data for the email messages, the email messages each associated with a domain owned by a domain owner, wherein said classification processing device is configured to determine for each one of the email messages a category selected from suspicious, legitimate but failing authentication, forwarded, or legitimate based on the aggregate level data and the message level data, when the domain for the one of the email messages is known to be owned by the domain owner, wherein the aggregate level data is received directly from an interne service provider and includes Domain-based Message Authentication, Reporting and Conformance (DMARC) aggregate data.

2. The classification system of claim 1, further comprising a storage device configured to store customer data including FROM DOMAIN and SENDING IP ADDRESS for known good and customer authorized email messages, each FROM DOMAIN associated with a respective SENDING IP ADDRESS,
wherein said classification processing device determines if the one of the email messages is an authorized IP address by comparing a FROM DOMAIN and SENDING IP ADDRESS of the one of the email messages with the FROM DOMAIN and SENDING IP ADDRESS stored in said storage device, and
wherein said classification processing device determines that the one of the email messages is not an authorized IP address if the FROM DOMAIN and SENDING IP ADDRESS of the one of the email messages does not match one of the FROM DOMAIN and respective SENDING IP ADDRESS stored in said storage device.

3. The classification system of claim 2, wherein said classification processing device determines that the one of the email messages is legitimate but fails authentication if it is an authorized IP address and any of DKIM, SPF and/or identifier alignment checks do not pass.

4. The classification system of claim 2 wherein said classification processing device determines that the one of the email messages is legitimate if it is an authorized IP address and all the DKIM, SPF and/or identifier alignment checks pass.

5. The classification system of claim 2, wherein said storage device is further configured to store a known forwarder list including a SENDING IP ADDRESS for a plurality of email messages, and said classification processing device determines that the one of the email messages is suspicious if the one of the email messages is not an authorized IP address and a SENDING IP ADDRESS for the one of the email messages does not match one of the SENDING IP ADDRESS in said storage device.

6. The classification system of claim 5, further comprising a phish detection processing device configured to determine, for the email messages that are determined to be suspicious, if the email message is phishing for a non-domain owner.

7. The classification system of claim 2, wherein said storage device is further configured to store a known forwarder list including a SENDING IP ADDRESS for a plurality of email messages, and wherein said classification processing device determines that the one of the email messages is forwarded if the one of the email messages is not an authorized IP address and a SENDING IP ADDRESS for the one of the email message matches one of the SENDING IP ADDRESSES in said storage device, and if an email message does not pass DKIM authentication.

8. The classification system of claim 7, wherein said classification processing device determines that the one of the email messages is legitimate if it is not an authorized IP address and a SENDING IP ADDRESS for the one of the email message matches one of the SENDING IP ADDRESSES in said storage device, and if an email message passes DKIM authentication.

9. The classification system of claim 1, wherein said classification processing device comprises a processor.

10. The classification system of claim 1, wherein said classification processing device alerts a user as to whether the one of the email messages is suspicious, legitimate but failing authentication, forwarded, or fully authenticated and legitimate.

11. The classification system of claim 1, wherein said classification processing device indicates to a user whether the one of the email messages is suspicious, legitimate but failing authentication, forwarded, or fully authenticated and legitimate.

12. The classification system of claim 1, wherein said classification processing device determines whether the email messages are suspicious, legitimate but failing authentication, forwarded, or fully authenticated and legitimate and indicates aggregates to a user.

13. A method of classification, the method comprising:
receiving at a classification processing device, aggregate level data and message level data for email messages, the aggregate level data received directly from an internet service provider and including Domain-based Message Authentication, Reporting and Conformance (DMARC) aggregate data; and
determining, at the classification processing device based on the aggregate and message level data, a category for each of the email messages, the categories including that the email message is suspicious, legitimate but failing authentication, forwarded, or legitimate when the domains are owned by the domain owner.

14. A classification system comprising:
a classification processing device configured to receive aggregate level data and message level data for email messages each associated with a domain owner, the aggregate level data received directly from an internet service provider and including Domain-based Message Authentication, Reporting and Conformance (DMARC) aggregate data, and to determine if one of the email messages is suspicious based on the received aggregate level data and message level data; and,
a phish detection processing device configured to determine that the suspicious email message is phishing if the email message is from a domain not owned by the domain owner.

15. The classification system of claim 14, wherein the email message data includes FROM DOMAIN and SENDING IP ADDRESS for known good and customer authorized email messages, each FROM DOMAIN associated with a respective SENDING IP ADDRESS.

16. The classification system of claim 15, further comprising a storage device configured to store email message data for the email messages, and wherein said phish detection processing device searches all the email messages, removes those that are legitimate email messages, and identifies those email messages that contain a branding term of the domain owner.

17. The classification system of claim 16, wherein said phish detection processing device searches the FROM DOMAIN and SENDING IP ADDRESS for the branding term, and determines that an email message is phishing for a non-domain owner if the branding term does not match any FROM DOMAIN and SENDING IP ADDRESS.

18. The classification system of claim 1, wherein the aggregate level data is received directly from an internet service provider through DMARC open source or direct data feed and includes the domain owner.

* * * * *